(12) United States Patent
Shaffer et al.

(10) Patent No.: US 6,700,901 B1
(45) Date of Patent: Mar. 2, 2004

(54) SYSTEM AND METHOD FOR DIGITAL TELEPHONES ON H.323 NETWORKS

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/188,877

(22) Filed: Nov. 9, 1998

(51) Int. Cl.[7] .............................................. H04L 12/56
(52) U.S. Cl. ...................... 370/466; 370/467; 370/401
(58) Field of Search ................... 370/338, 401, 370/466, 467, 352, 354, 355; 379/93.01, 93.06, 93.15, 93.05, 93.07, 93.14

(56) References Cited

U.S. PATENT DOCUMENTS

| | | | |
|---|---|---|---|
| 4,642,805 A | | 2/1987 | Dumas et al. .................. 370/58 |
| 5,467,387 A | | 11/1995 | Kienberger .................. 379/167 |
| 5,604,737 A | * | 2/1997 | Iwami et al. ................. 370/352 |
| 5,742,596 A | | 4/1998 | Baratz et al. ................ 370/356 |
| 5,748,628 A | * | 5/1998 | Ericson et al. ............... 370/384 |
| 5,761,294 A | * | 6/1998 | Shaffer et al. ............... 379/230 |
| 5,764,750 A | * | 6/1998 | Chau et al. .................. 379/229 |
| 5,799,067 A | * | 8/1998 | Kikinis et al. ............... 370/294 |
| 5,892,764 A | * | 4/1999 | Riemann et al. ............. 370/401 |
| 6,111,924 A | * | 8/2000 | McKinley .................... 375/354 |
| 6,130,893 A | * | 10/2000 | Whittaker et al. ............ 370/420 |
| 6,144,724 A | * | 11/2000 | Stovall ..................... 379/93.05 |
| 6,157,620 A | * | 12/2000 | Danne et al. ................. 370/294 |
| 6,202,084 B1 | * | 3/2001 | Kumar et al. ................ 709/204 |
| 6,282,189 B1 | * | 8/2001 | Eames ........................ 370/352 |
| 6,363,430 B1 | * | 3/2002 | Thomas ..................... 709/245 |

FOREIGN PATENT DOCUMENTS

EP      0 829 995 A2     9/1997

\* cited by examiner

*Primary Examiner*—Kenneth Vanderpuye

(57) ABSTRACT

A communications system and interface (109, 210) for interfacing a proprietary digital telephone (108, 114) to a local area network (LAN) (104). The interface may be embodied in a computer expansion card or a stand-alone unit. The interface converts signals from the proprietary digital telephone's communication protocol to the LAN's communication protocol. In a specific embodiment, the LAN communication protocol is the H.323 protocol.

6 Claims, 9 Drawing Sheets

SYSTEM AND METHOD FOR DIGITAL TELEPHONES ON H.323 NETWORKS

BACKGROUND OF THE INVENTION

The present invention relates to telecommunications, and in particular, to telephony-over-local area network (LAN) applications.

Suppliers of telecommunications equipment are increasingly providing telephony-over-LAN (TOL) applications. In such applications, telephony features are provided over or via the local area network rather than through a separate telephony network and private branch exchange. Such systems provide advantages in that all telecommunication functions are able to be provided over the same network.

However, such systems are disadvantageous in that proprietary telephones such as digital telephones have an enormous installed base of dedicated users. In addition, many digital phones are present on the market, which include sophisticated features, which users may not be willing to relearn. At present, no way of using such proprietary digital telephones in TOL applications is known. Accordingly, there is a need for support of proprietary digital phones over a local area network.

SUMMARY OF THE INVENTION

These disadvantages of the prior art are overcome in large part by a system and method for providing support for digital telephones on local area networks. According to a first embodiment, a digital telephone may be plugged into a special interface card in the user's personal computer. The personal computer's network interface card (NIC) is used to interface with the local area network. The telephone is used as a microphone and speaker such that the special interface card (PC interface card) converts the digital stream from the telephone into a digital stream which would normally be detected by a sound card. This converted digital stream can then fed into the LAN client software for handling as if the PC's microphone had been used. Similarly, when voice is received from the network to the phone, the PC interface card emulates a sound card so that the LAN client software believes it is playing the voice over the sound card speaker, when in fact, voice is transmitted to the proprietary digital stream used by the proprietary digital telephone. In some specific embodiments, the local area network is an H.323 network and the PC interface card converts between H.323 and H.450 protocol digital streams and the proprietary digital stream.

According to an alternate embodiment, the telephone is coupled to an adapter bridge and, in turn to a local area network. The adapter bridge contains transcoding converters, a NIC, control processors and software, used to convert the digital protocol and the local area network protocol.

These and other embodiments are described in more detail below in conjunction with the below drawings.

DETAILED DESCRIPTION OF SPECIFIC EMBODIMENTS OF THE INVENTION

Figure 1:
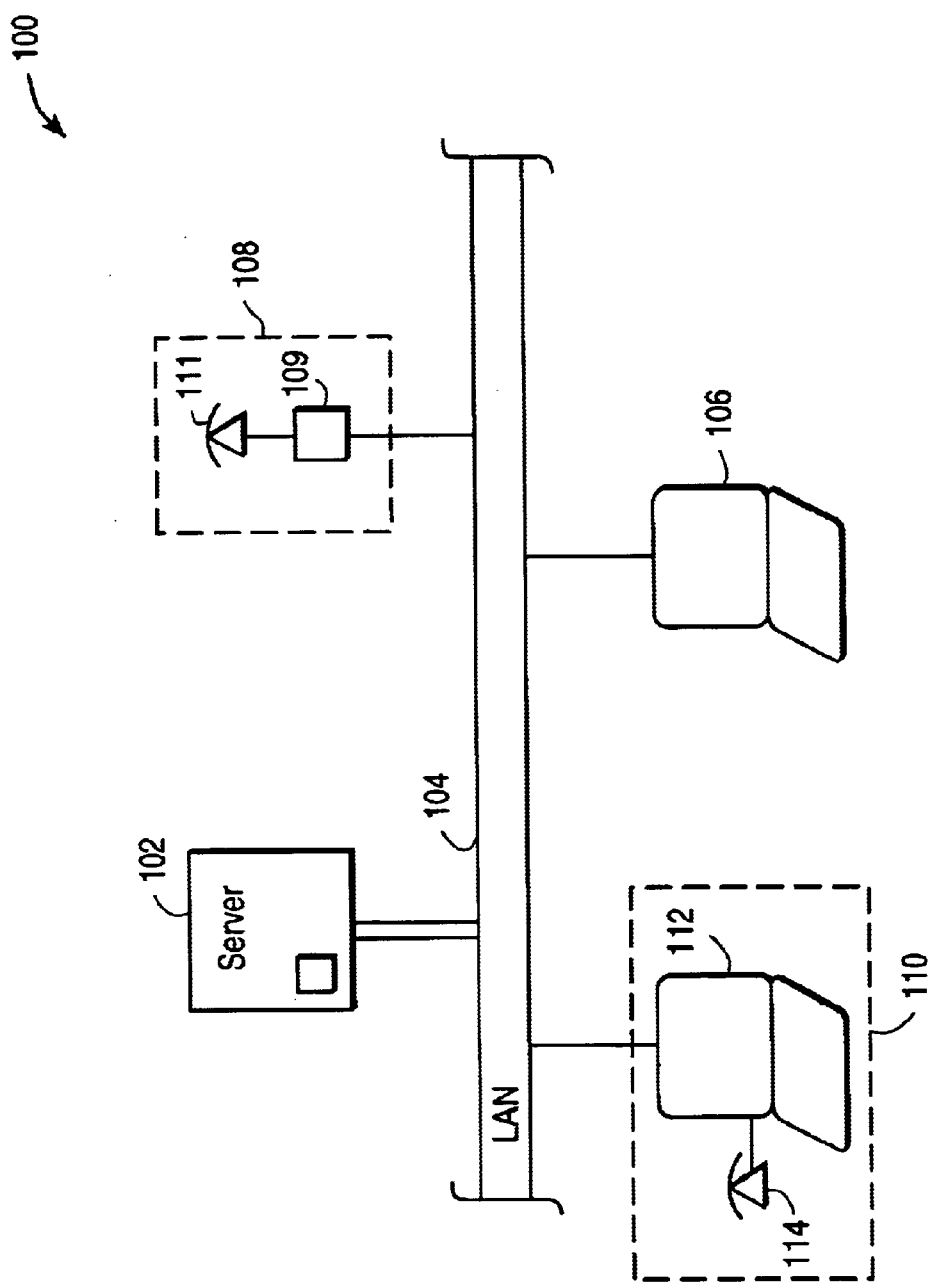
FIG. 1 is a diagram illustrating local area network configuration according to the present invention.

FIG. 1 illustrates a local area network 100 including a LAN/Telephony server 102. As is known, the LAN/Telephony server 102 provides local area network server functions and also telephony server functions. It is noted that in alternate embodiments the telephony server may be provided separately from the local area network server. In addition to the server 102, a variety of computers 106 may be coupled to the LAN 104. A LAN telephone 108 including a proprietary digital telephone 111 and an interface bridge 109, according to the present invention, is coupled to the local area network. Furthermore, a telephony computer 110 may be coupled to the local area network. According to this embodiment, the telephony computer 110 may include a proprietary digital telephone 114 coupled to a personal computer 112, which in turn is coupled to the local area network via a network interface card as will be discussed in greater detail below.

Figure 2:
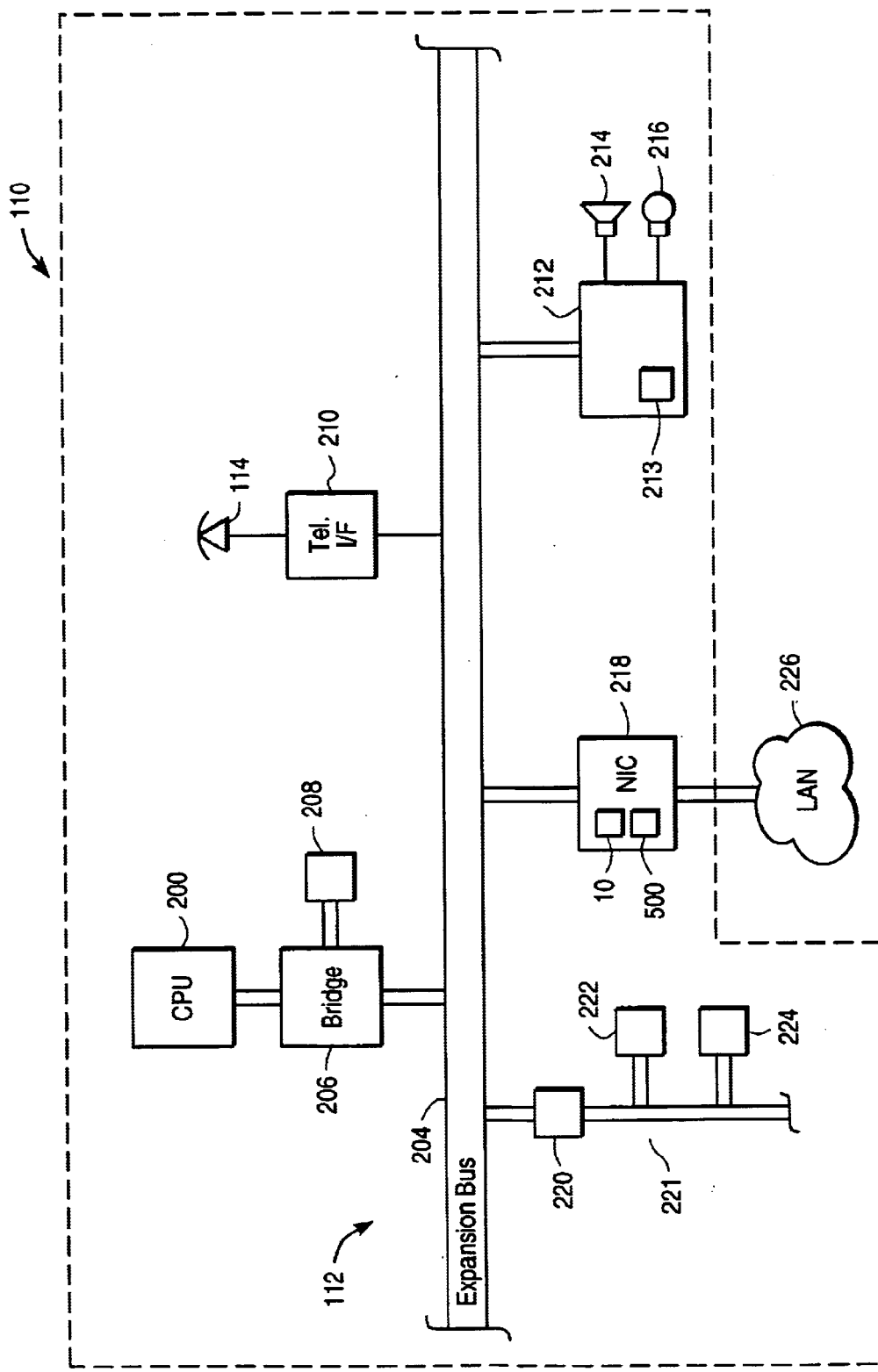
FIG. 2 is a block diagram illustrating a computer system according to an embodiment of the present invention.

FIG. 2 illustrates an exemplary diagram of the telephony computer 110 in greater detail. In particular, telephony computer 110 includes a computer such as a personal computer 112 that includes a processor 200 coupled to a bus bridge 206 and an expansion bus 204. Memory such as RAM 208 may be coupled to the bus bridge 206. The bus bridge 206 may further include cache memory (not shown) as is known in the art. The central processing unit (CPU) 200 may be embodied as X86 compatible processor, such as a Pentium or Pentium II, or a Power PC processor or any other variety of other known processors. The expansion bus 204 may be embodied as any of a variety of expansion buses, including a Peripheral Component Interconnect (PCI) bus, an Industry Standard Architecture (ISA), Extended Industry Standard Architecture (EISA), or Micro-Channel Architecture (MCA) bus. Coupled to the expansion bus 204 are a plurality of input/output (I/O) devices such as a bus bridge 220 which couples to a further expansion bus 221, which may be embodied as a MCA bus, an ISA bus, an EISA bus, or a secondary PCI bus. Further I/O devices 222 and 224 may be coupled to the expansion bus 221. In addition, a conventional network adaptor or network interface card (NIC) 218 may be coupled to the expansion bus 204 and also to the local area network 226. Other I/O devices may be provided coupled to the expansion bus 112 or 204, such as SCSI hard drives, PC card adapters, and video I/O devices.

A sound card or system 212 also may couple to the expansion bus 204. The sound card 212 may include sound logic 213 and couples to one or more speakers 214 and to one or more microphones 216. The sound logic 213 may include one or more codecs (not shown), which perform analog-to-digital (A/D) and digital-to-analog (D/A) conversion functions. The sound logic 213 may also perform audio compression and decompression, as well as amplification. The sound logic 213 may include functionality such as MIDI and wave table synthesis. The sound logic 213 may be embodied as Sound Blaster or Sound Blaster-compatible circuitry available from Creative Labs, Inc., Milpitas, Calif.

Finally, a telephony interface card 210 according to the present invention may be coupled to the expansion bus 204. The telephony interface card 210 includes circuitry for coupling to a proprietary digital telephone 114. As will be explained in greater detail below, the telephony interface card 210 according to one embodiment is configured to transparently emulate certain functionalities of the sound card 212 such that software running on the CPU 200 is unaware that an incompatible process is being executed. According to another specific embodiment, a sound card may not be present.

The digital telephone 114 may be any proprietary digital telephone, such as an OPTISET® E phone or ROLMphone® telephone available from Siemens Information and Communication Networks, Inc., Santa Clara, Calif. As is known, such phones use proprietary digital protocols such as described in Kienberger, U.S. Pat. No. 5,467,387 and Dumas, et al. U.S. Pat. No. 4,642,805, both of which are hereby incorporated by reference in their entirety as if fully set forth herein.

Figure 3:
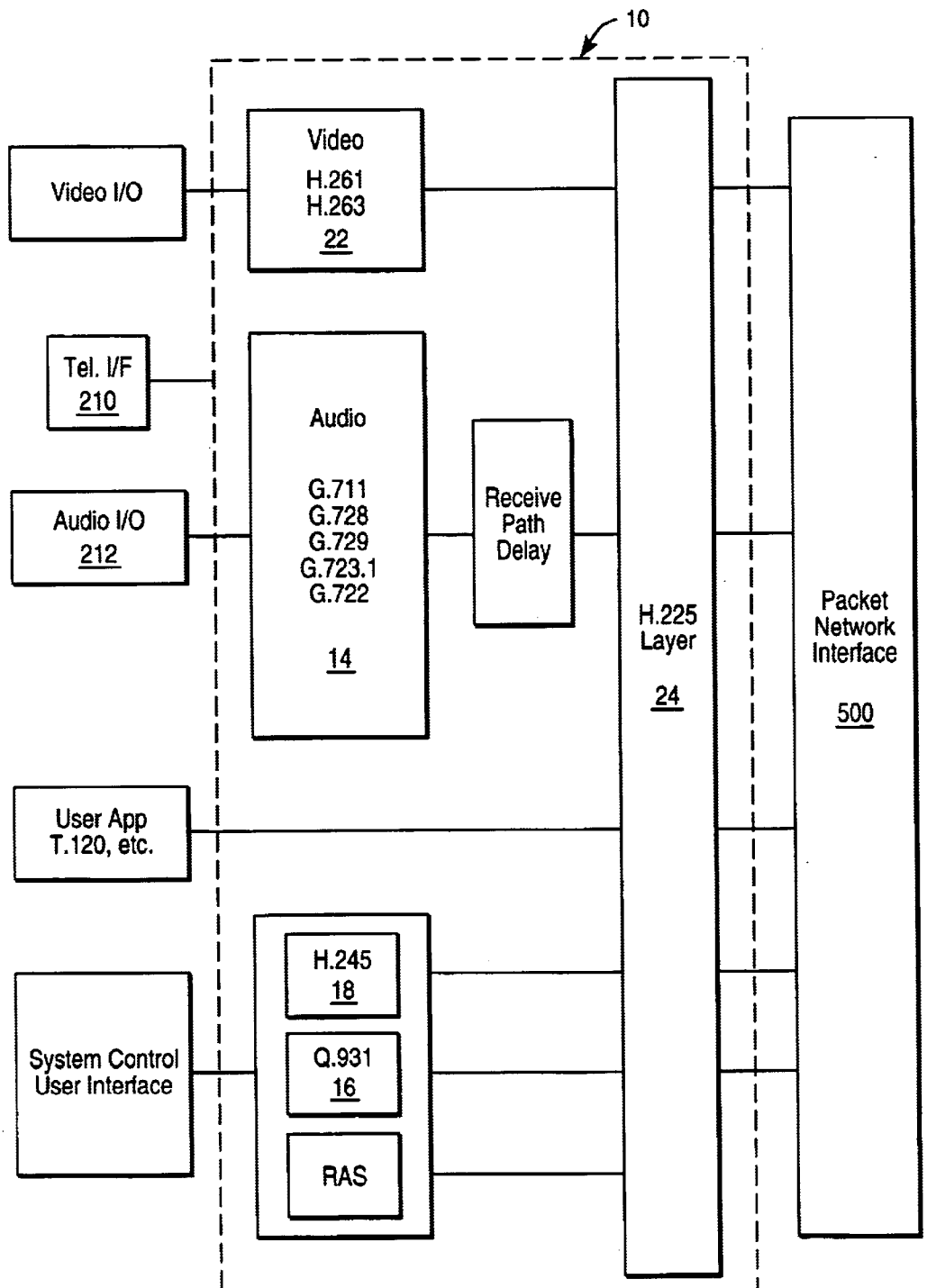
FIG. 3 is a block diagram of an exemplary network interface card.

For a better understanding of the present invention, FIG. 3 illustrates a specific embodiment of the network interface card 218 (shown in FIG. 2) that may include a LAN/packet network interface 500 and a known network terminal 10 utilizing the International Telecommunication Union (ITU-T) H.323 standard protocol, which is herein incorporated by reference. Other networking protocols may also be used in other specific embodiments. As seen in FIG. 3, the network terminal 10 includes, among other things, an audio coder/decoder (codec) 14 connected to an Audio I/O interface 12, and a Q.931 specification based protocol 16, including an H.245 layer 18, connected to a System Control User Interface (SCUI) 20. H.323 terminals and equipment carry real-time voice, video and/or data. It should be noted that H.323 is an umbrella recommendation that sets standards for multimedia communications, including telephony over LANs. These networks include packet-switched TCP/IP and IPX over Ethernet, Fast Ethernet and Token Ring Networks. For purposes of the present invention, only the Audio I/O and the SCUI standards will be further described, as these are the interfaces used in operation of the present invention in a voice network environment. It should be noted, however, that the Video I/O interface 22 and related codecs may be used in video applications in a manner similar to that described below for audio applications.

As shown in FIG. 3, the Audio I/O interface or card 212, connects to audio codec 14, such as a G.711 codec, for encoding and decoding audio signals. Although the G.711 codec is the mandatory audio codec for an H.323 terminal, other audio codecs, such as G.728, G.729, etc., may also be used in other embodiments for encoding and decoding speech. G.723 is a preferred codec because of its reasonably low bit rate, which enables preservation of link bandwidth, particularly in slower speed network connections.

The SCUI 20 provides signaling and flow control for proper operation of the H.323 terminal. The SCUI 20 encompasses the H.245 standard 16, which is the media control protocol that allows capability exchange, channel negotiation, switching of media modes and other miscellaneous commands and indications. The H.225 standard layer 24, which is derived from the Q.931 standard 16, is the protocol for establishing connection between two or more terminals and also formats the transmitted video, audio, data and control streams into messages for output to the network interface. The H.225 layer 24 also retrieves the received video, audio, data and control streams from messages that have been input from the network interface. Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone.

Figure 4:
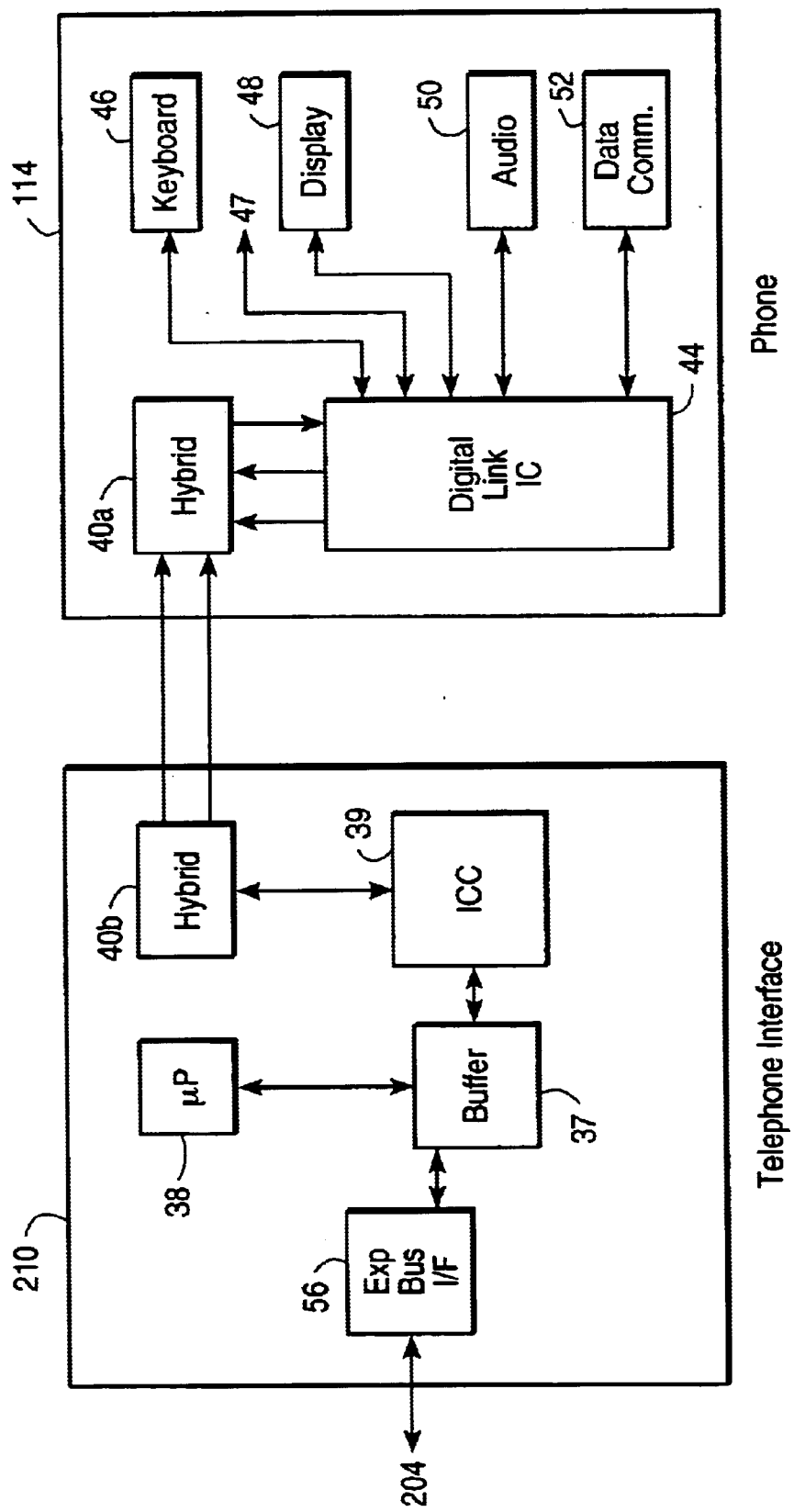
FIG. 4 is a block diagram illustrating a telephony interface and telephone according to an embodiment of the present invention.

FIG. 4 is a block diagram illustrating a specific embodiment of the connection of one type of proprietary digital telephone 114 to the telephony interface card 210 shown in FIG. 1. In this specific embodiment, the proprietary digital telephone 114 includes a hybrid 40a for coupling to, for example, twisted pair wiring 30, which couples to the telephony interface card 210. The hybrid 40a is coupled to a digital link integrated circuit 44, such as described in U.S. Pat. No. 4,642,805. In other specific embodiments, the hybrids of FIG. 4 could be replaced with circuitry providing a wireless logical link between the proprietary digital telephone 114 and telephony interface card 210. The digital link circuit 44 is able to communicate with a keyboard module 46, a telephony processor (not shown) coupled to a line 47, a display module 48, an audio channel 50 and a data communications channel 52. The keyboard module 46 coupled to line 47 and display module 48 may in fact be asynchronous channels employing protocol different than that associated with the channel 58 and data communications channel 52.

As seen in FIG. 4, telephony interface card 210 includes an expansion bus interface 56 such as a PCI interface for coupling to the expansion bus 204 (FIG. 2). It is noted that other bus architectures besides PCI may be employed in other specific embodiments. In telephony interface card 210, expansion bus interface 56 couples to a buffer memory 37. Transfer of data to and from the buffer memory 37 is controlled by a control processor 38. The buffer memory 37 also couples to a hybrid network 40b via an integrated channel circuit (ICC) 39. The integrated channel circuit 39 may be embodied as described in U.S. Pat. No. 4,642,805.

As will be discussed in greater detail below, telephony interface card 210 is configured to receive the digital transmissions from the proprietary digital telephone 114 and convert the received digital signals into signals for the expansion bus 204, and in particular the PCI bus 204. Thus, the expansion bus (PCI) interface 56 receives the digital signals from the buffer memory 37 and packs them into PCI burst packets, for example. Moreover, as will be discussed in greater detail below, according to one embodiment, the expansion bus interface 56 and/or control processor 38 is further configured to convert the received digital signals into a format or protocol corresponding to the sound system 212. As discussed above, the signals may be in a Sound Blaster-compatible format. For example, a look-up table may be stored in memory to provide sound card signals that correspond to the digital telephone signals. These are then recognized by the H.323 interface and transmitted onto the network.

Figure 5:
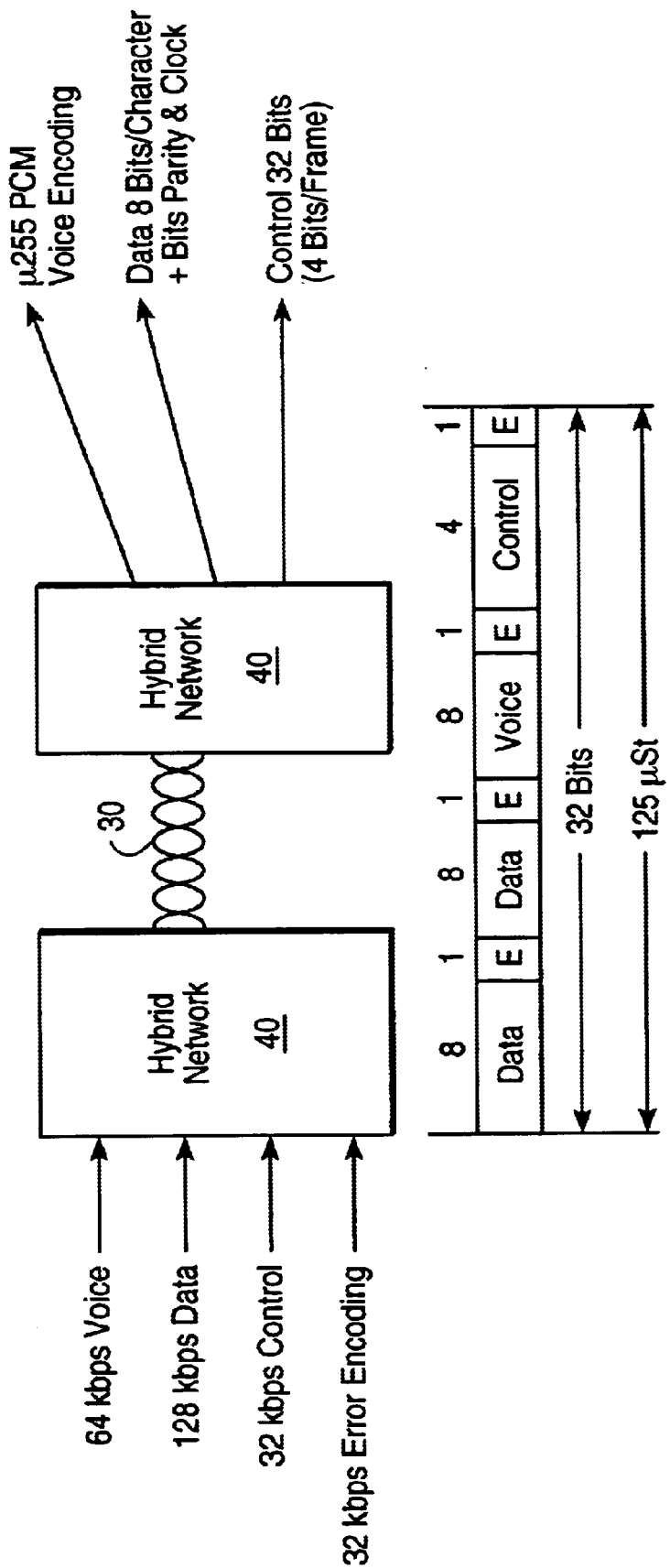
FIG. 5 is a diagram illustrating a digital transmission format according to an embodiment of the invention.

To effect a communication between the telephone interface card 210 and the telephone 114, the ICC 39 transmits a unique pattern to enable the digital link circuit 44 to become synchronized. Once synchronization occurs, frames are transmitted in both directions over the logical link between the units. FIG. 5 is a block diagram and chart used to describe the format of digital transmissions used in this specific embodiment. Each frame, as shown in FIG. 5, includes 32 bits which are transmitted over a period of 125 microseconds. The first field of 8 bits is data followed by a parity bit. The second field of 8 bits, again data, is followed by another parity bit. The next 8-bit field is voice, again followed by a parity bit. The last field of 4 bits is control with the last bit being a parity bit for these control bits. A complete Control message is 16 bits long and is transmitted twice. Thus, a complete control sequence requires a super frame, eight of the frames shown in FIG. 5.

As is described in greater detail in U.S. Pat. No. 4,642, 805, the first 8 bits of each Control message transmitted downlink are echoed, that is, returned uplink to the ICC 39 from the digital link circuit 44 to verify that the control fields have been correctly received. Resynchronization occurs when framing is lost. As shown in FIG. 5, the digital link in each direction transmits 64 bits per second of voice, a 120 K bps of data, 32 K bps of control information and 32 K bps of error encoding. In one embodiment, voice is encoded using standard MU255 PCM encoding. Data employs 8 bits per character with an additional 8 bits for parity and clock signaling and, as mentioned, Control messages are 16-bits in length and repeated once. Manchester encoding is used for transmission over the twisted pairs. The hybrid networks 40a, 40b provide the driving current for the twisted pair and perform a duplexing function. Each network receives a differential transmission signal and provides a receive signal for its respective integrated circuits. In other specific embodiments, other encoding schemes and related circuitry appropriate for the physical layer of the digital link would be used (e.g., in a cordless or wireless digital link, CDMA encoding might be used).

As will be discussed in greater detail below, when an incoming message is received by the network interface card 218, the network interface card 218 provides a control signal onto the expansion bus 204. According to one embodiment, the telephony interface 210 receives the control signal and transmits a signal via the PCI interface 56 to the sound card 212, temporarily decoupling the sound card 212. (If a sound card is not present, this is unnecessary). Then, the network interface card 218 provides the incoming telephony message onto the expansion bus 204 where it is received by the telephony interface 210. Similarly, when an outgoing call is to be made, the telephony interface 210 receives the data in the digital format described above and provides it via the buffer memory 37 to the PCI interface 56. The PCI interface 56 and/or control processor 38 converts the data into a sound card format and provides it as PCI burst cycles onto the expansion bus 204, from which it is provided to the network interface card 218. It is noted that in alternate embodiments, conversion to sound card format may not be necessary. However, conversion into sound card format may be provided to minimize software changes necessary in the H.323 software.

Figures 6A, 6B:
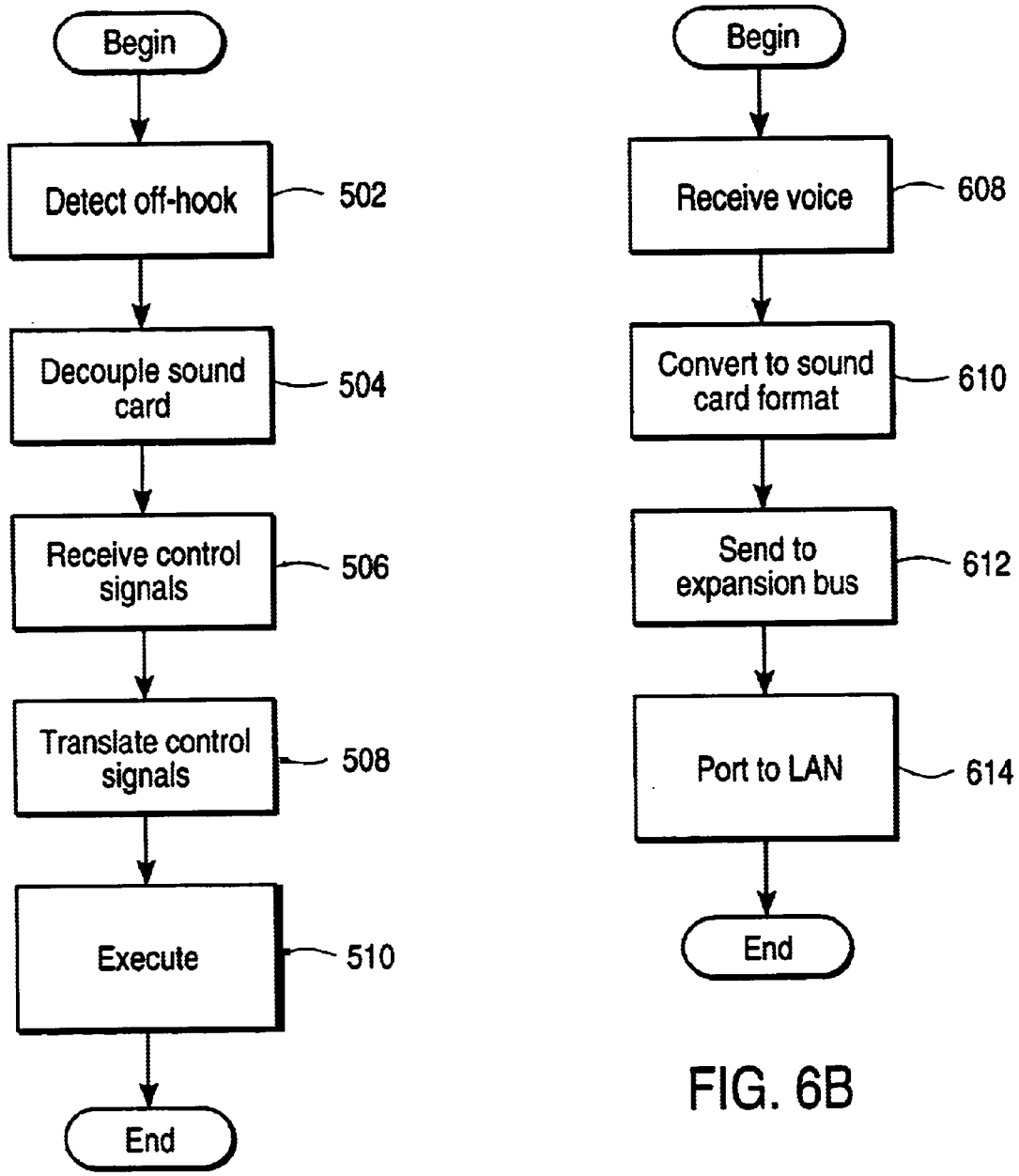
FIGS. 6A and 6B are flowcharts illustrating operation of an outgoing call according to an embodiment of the present invention.

FIG. 6A is a flowchart illustrating the process for making a phone call from the proprietary digital telephone 114, according to this specific embodiment of the present invention. In particular, in a step 502, digital telephone 114 detects an off-hook condition in a normal manner and relays this information across the logical link from phone 114 to telephony interface 210. In this embodiment, this information is relayed to the telephony interface bridge 210 across the twisted pair linking the hybrid 40 with the hybrid 40b. The control processor 38 sends a signal to the sound card 212 causing it to decouple in a step 504 (if a sound card is present). This decoupling prevents interfering inputs from the sound card. In addition, the telephony bridge 210 communicates with the network interface card 218 to provide a dial tone to the telephone 114 via the PC bus. In a step 506, the key signals such as control signals or DTMF signals are received at the telephony interface card 210. These control signals are then translated by the control processor 38 into signals recognizable by the H.323 software running on the network interface card 218 in a step 508. For example, the call setup command may be converted to an H.245/Q.931 setup exchange. In a step 510, the SCUI 20 running the H.323 software executes the commands according to the H.323 standard, and sends them out the network interface 500.

FIG. 6B illustrates the call completion process begun in FIG. 6A. In step 608, circuitry in telephony interface 210 receives voice signals from digital telephone 114. More particularly, in a step 608, the hybrid 40b receives voice signals from the digital telephone 114. The ICC 39 receives and synchronizes the signals as described in U.S. Pat. No. 4,642,805. The control processor 38 then may convert the received audio signals into a predetermined sound card format, in a step 610. As discussed above, this may include the processor accessing non-volatile memory (not shown) for a look-up table of conversion values. It is noted that in an alternate embodiment, no conversion may be needed when a sound card is not used.

Next, in a step 612, the audio signals are provided by the expansion bus interface 56 to the expansion bus 112. For example, the data may be provided as first PCI cycles. Finally, in a step 614, the PCI or expansion bus data are provided to the H.323 device 10 and then to the LAN via the network interface 500.

Figure 7A:
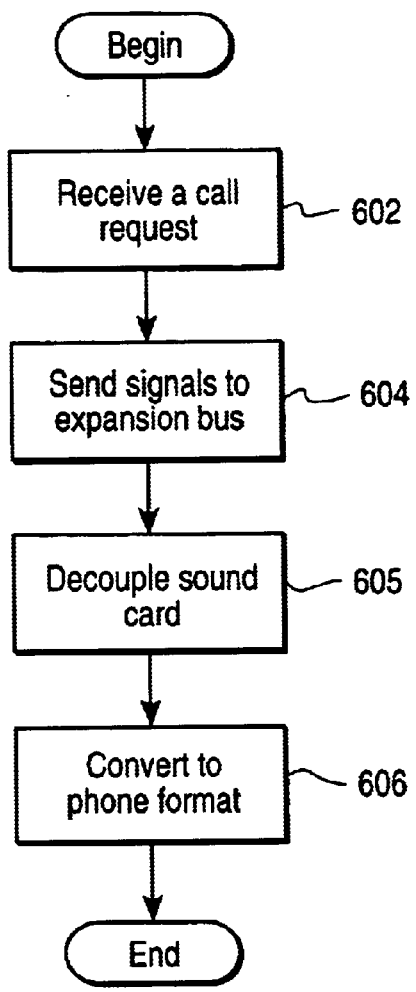
FIGS. 7A and 7B are flowcharts illustrating operation of an incoming call according to an embodiment of the present invention.

FIG. 7A is a flowchart illustrating call reception procedures according to the specific embodiment of the present invention of FIG. 2. In particular, in a step 602 a call is received at the network interface card 218 of the personal computer 112. In particular, a call request is received at the network interface 500. The request is provided to the H.323 network terminal, which translates the request in a known manner. In a step 604, the SCUI 20 sends the receive signal onto the expansion bus 204. The telephony interface 210 detects the signal and may cause the sound card 212 to be disconnected so that the signal is not transmitted to the sound card in a step 605. In embodiments where a sound card is not used, the SCUI 20 may provide the disconnect command directly. In a step 606, the interface 210 receives the signaling and converts it into a protocol or format that is compatible with the telephone 114. For example, the interface card 218 may receive a Setup message and respond with a Q.931 Alerting message and a Connect message if the digital telephone accepts the message.

Figure 7B:
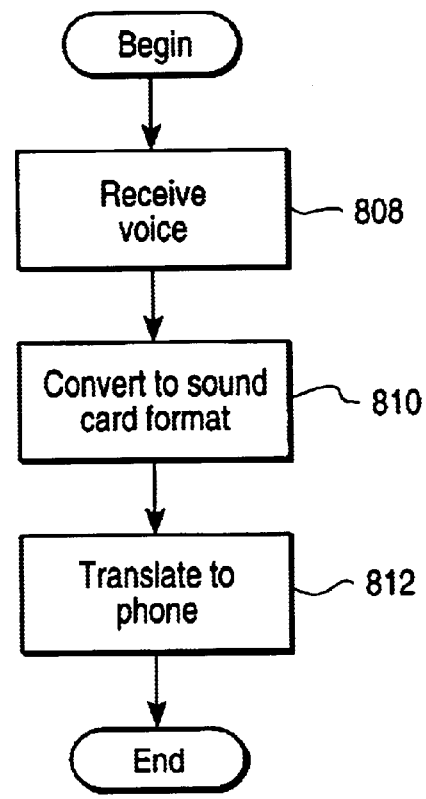

Turning now to FIG. 7B, the voice transmissions or audio signals are handled similarly. In particular, in a step 808, the voice signals are received by the network interface card 218. In a step 810, the signals may be converted in a known manner into a format compatible with the sound card format. Alternatively in embodiments where a sound card is not used, the signals as received may be provided onto the expansion bus 204 and then to the telephony interface 210. The telephony interface 210 then converts the signals either as received, or as converted from sound card format into a format that is compatible with telephone 114, in a step 812. The sounds then play over phone 114. The call may be terminated by the digital telephone user hanging up. A signal is provided to the network interface 218, which provides an End Session message to the caller. The caller's terminal responds with an End Session message in a known manner.

Figure 8:
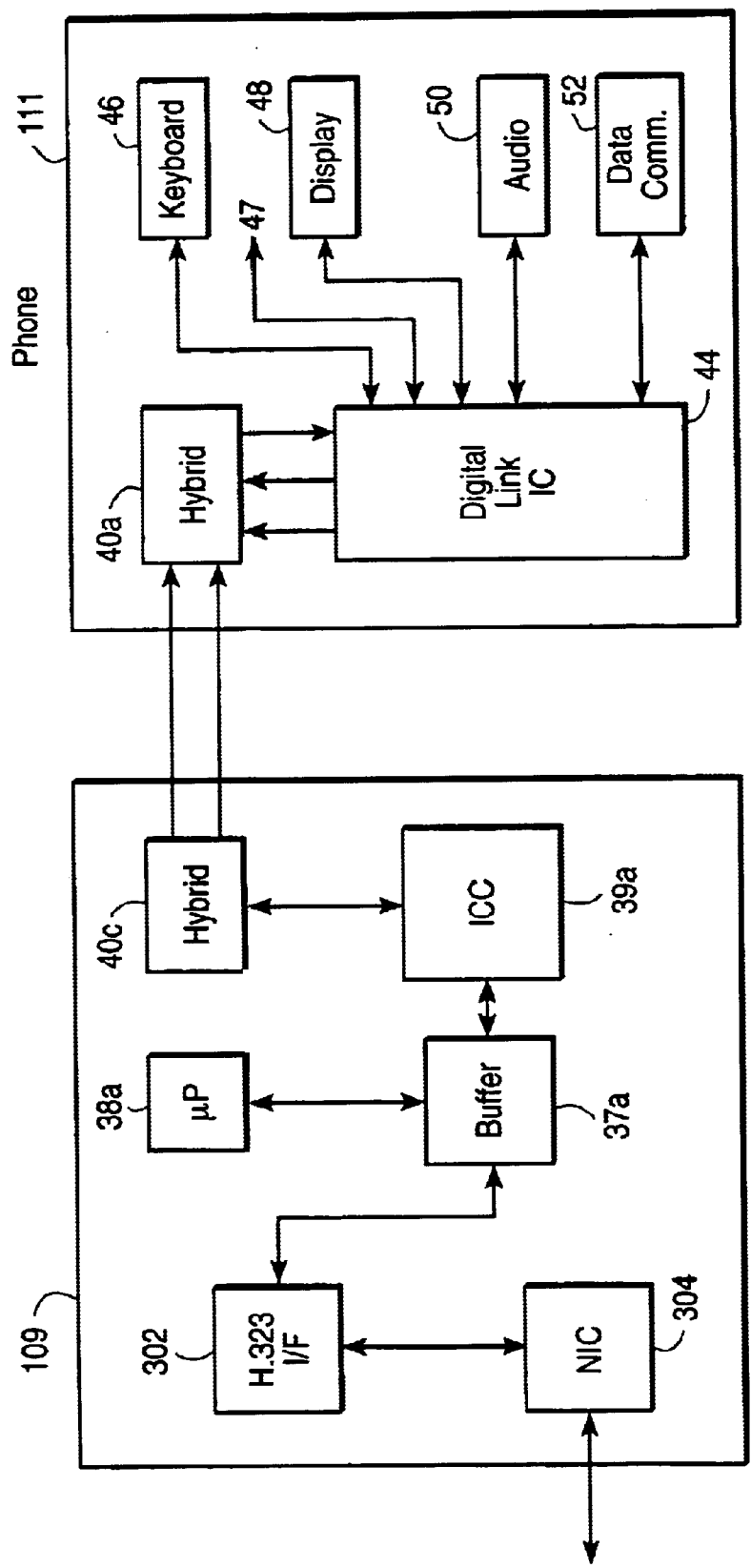
FIG. 8 is a block diagram illustrating a telephony interface and telephone according to another embodiment of the invention.

FIG. 8 is a block diagram of a specific embodiment of LAN telephone 108 that includes telephone interface 109 and proprietary digital telephone 111 of FIG. 1 shown in greater detail. The telephony interface 109 includes an interface similar to that described above with regard to the telephony card 210. In particular, the telephony interface 109 includes a hybrid 40c, coupled to communicate with a hybrid 40a on the proprietary digital telephone 111 (the telephone 108 is generally similar to that described above with regard to telephone 114 of FIG. 4). The hybrid 40c, in turn, is coupled to an integrated channel circuit 39a and provides digital data to the buffer memory 37a. A microprocessor 38a controls transfers of the data from the buffer memory 37a to the H.323 interface 302. The H.323 interface 302, in turn, provides the data to a network interface 304 for transmission onto the local area network. The H.323 interface is generally similar to that described above with respect to FIG. 3. The network interface 304 also corresponds generally to the LAN/packet network interface 500 of FIG. 3. As can be appreciated, microprocessor 38a converts the digital telephony signals into H.323 compatible signals, for example, by storing and accessing a look-up table. In the embodiment illustrated, the conversion may be direct, since sound card software is unnecessary.

Figures 9A, 9B:
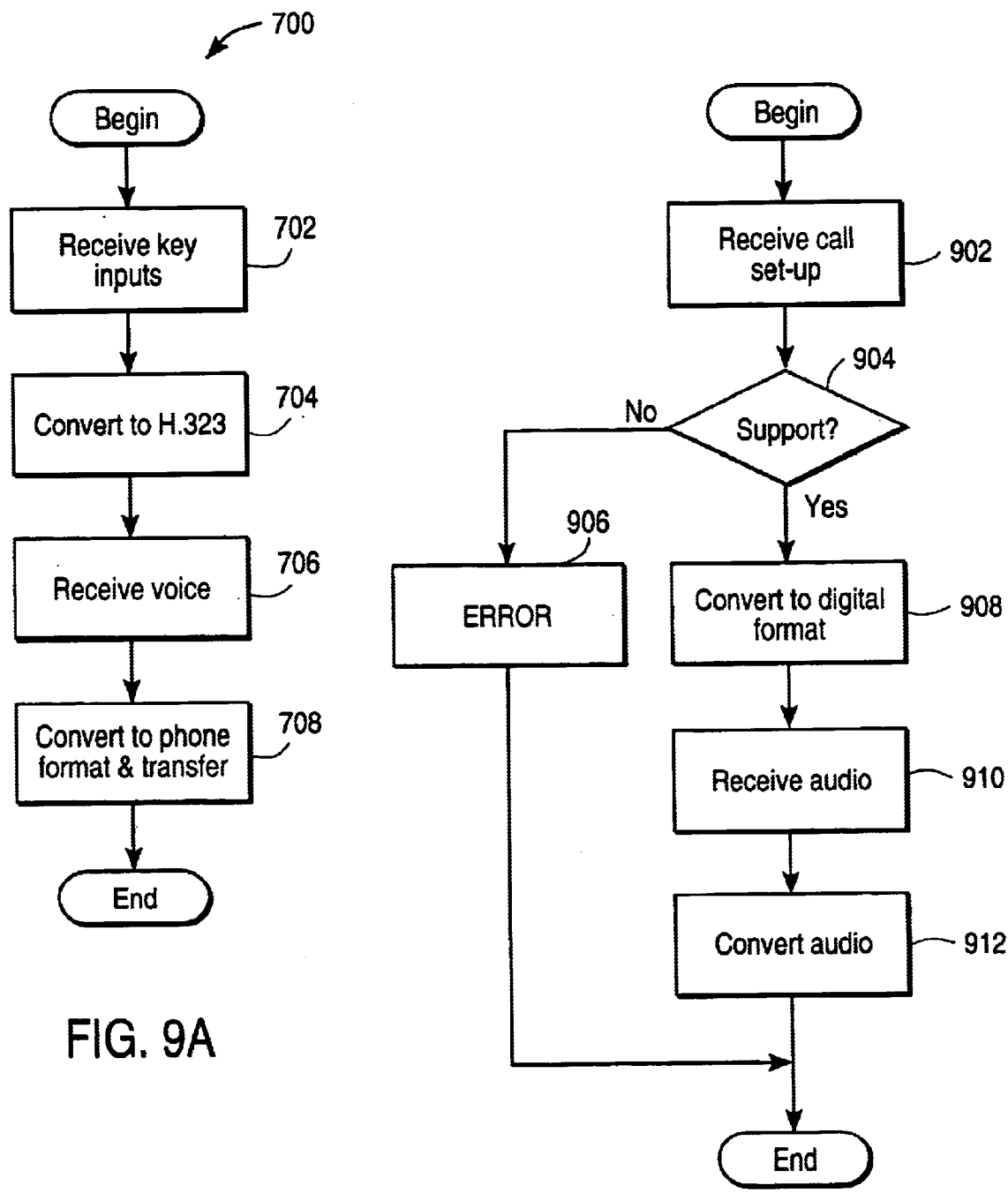
FIGS. 9A and 9B are flowcharts illustrating call processing according to the embodiment of FIG. 8.

FIG. 9A is a flowchart 700 illustrating the outgoing call procedure for the embodiment of FIG. 8. In particular, in a step 702, the interface 109 receives command signals from the proprietary digital phone 111. Such command signals may be of the form described with respect to FIG. 5 or as disclosed in U.S. Pat. No. 5,467,387 or U.S. Pat. No. 4,642,805. For example, the keystrokes may cause a start-up or call set-up command, or the like, to be transmitted to the interface 109 across the logical link between interface 109 and phone 111. Alternatively, the signals may be DTMF signals or signals transmitted in other known formats. These commands or signals are carried across the twisted pair from the hybrid 40a to the hybrid 40c, in the specific embodiment. In other specific embodiments, these commands or signals are carried across the logical link (this link may be established over any physical layer medium such as a twisted pair, wireless medium, or other medium) between interface 109 and phone 111. In a step 704, the interface 109 converts the received digital signals into H.323 compatible signals. In particular, the signals are provided from buffer 37a to the H.323 interface 302. The signals may then be read, converted and sent to the LAN via the network interface 304. For example, a look-up table (not shown) stored in memory may contain conversion values or parameters for the command translation. In a step 706, the interface 109 receives voice signals from the proprietary digital phone 111 (e.g., again via the hybrids 40a and 40c to the ICC 39a). Again, the digital format of the signals may correspond to the format described in U.S. Pat. No. 5,467,387 or U.S. Pat. No. 4,642,805, or other known formats. In a step 708, the interface 109 converts the digital voice signals into a H.323 signal and provides them out onto the LAN via the network interface 304.

Turning now to FIG. 9B, a diagram illustrating receiving of telephone calls via the embodiment of FIG. 8 is shown. In particular, in a step 902, the network interface 109 receives the call setup signals from the local area network. In a step 904, the interface 109 (e.g., the control processor 38a) determines whether or not the commands or data are supported. If the commands or data are not supported, then in a step 906 the interface 109 sends the appropriate H.323 Error message. If the commands or data are, in fact, supported, then in a step 908, the received data are converted into data compatible with the proprietary digital telephone 111. In a step 910, the audio signals are received, and in a step 912 are converted and transferred to the proprietary digital telephone 111.

What is claimed is:

1. A telecommunications system comprising:
   a computer system, said computer system including one or more computers coupled to a local area network (LAN);
   one or more digital telephone devices coupled to said LAN; and
   an interface, operably coupled to said one or more digital telephone devices, said interface converting signals between a format compatible with said one or more digital telephones and a format compatible with said LAN,
   wherein at least one of said one or more digital telephones is embodied in an expansion card in at least one of said one or more computers,
   wherein said interface includes a hybrid for interfacing to a hybrid on one of said telephones;
   an integrated channel circuit for providing supervisory and timing functions for communications between said interface and said digital telephone; and
   means for interfacing to said LAN.

2. The telecommunications system in accordance with claim 1, wherein said interfacing means includes means for interfacing to a local bus.

3. The telecommunications system in accordance with claim 1, wherein said interfacing means includes a LAN network interface card.

4. A telecommunications system comprising:
   one or more digital telephone devices operably coupled to a local area network (LAN);
   an interface, operably coupled to said one or more digital telephone devices, said interface converting signals between a format compatible with said one or more digital telephones and a format compatible with said LAN;
   wherein said interface includes
      a hybrid for interfacing to a hybrid on one of said digital telephones;
      an integrated channel circuit for providing supervisory and timing functions for communications between said interface and said digital telephone; and
      a LAN interface.

5. A telecommunications system comprising:
   a computer system, said computer system including one or more computers coupled to a local area network (LAN);
   one or more digital telephone devices coupled to said LAN; and
   an interface, operably coupled to said one or more digital telephone devices, said interface converting signals between a format compatible with said one or more digital telephones and a format compatible with said LAN,
   wherein at least one of said one or more digital telephones is embodied in an expansion card in at least one of said one or more computers,
   wherein said interface includes a wireless logical link for interfacing to a wireless logical link on one of said digital telephones;
   an integrated channel circuit for providing supervisory and timing functions for communications between said interface and said digital telephone; and
   means for interfacing to said LAN.

6. A telecommunications system comprising:
   one or more digital telephone devices operably coupled to a local area network (LAN);
   an interface, operably coupled to said one or more digital telephone devices, said interface converting signals between a format compatible with said one or more digital telephones and format compatible with said LAN;
   wherein said interface includes
      a wireless logical link for interfacing to a wireless logical link on one of said digital telephones;
      an integrated channel circuit for providing supervisory and timing functions for communications between said interface and said digital telephone; and
      a LAN interface.

* * * * *